Patented Nov. 20, 1951

2,576,064

UNITED STATES PATENT OFFICE 2,576,064

PRODUCTION OF 3-FLUOROSALICYL-ALDEHYDE

Edgar C. Britton and James D. Head, Midland, Mich., assignors to The Dow Chemical Company, Midland, Mich., a corporation of Delaware No Drawing. Application December 23, 1949, Serial No. 134,836

1 Claim. (Cl. 260—600)

This invention relates to an improved method for the production of 3-fluorosalicylaldehyde.

The importance of 3-fluorosalicylaldehyde has been greatly increased as a consequence of recent chemical research. Tsumaki (see J. Chem. Soc. Japan, 58, 1288 (1937)) showed that the cobalt chelate of the Schiff's base from salicylaldehyde and ethylene diamine would absorbe oxygen, and that the absorption was reversible. Calvin (see J. Am. Chem. Soc., 68, 2254 (1945)) investigated various compounds similar in structure to salicylaldehyde, his goal being to determine what material formed a cobalt chelate best suited for commercial use (e. g., for absorbing oxygen from air and thereby providing an inexpensive means for separating oxygen from nitrogen of the air). The most efficient cobalt chelate found by Calvin was that from 3-fluorosalicylaldehyde. The present invention is based on the discovery of a commercially practical method for producing 3-fluorosalicylaldehyde.

According to the invention 3-fluorosalicylaldehyde is produced by a new method involving the steps of: (1) diazotizing 5-chloro-o-anisidine and converting the resulting diazotized material to 4-chloro-2-fluoroanisole by (A) forming the diazonium fluoborate by the action of fluoboric acid, and (B) thermally decomposing the diazonium fluoborate; (2) hydrolyzing the methoxy radical of the 4-chloro-2-fluoroanisole to produce 4-chloro-2-fluorophenol; (3) converting the 4-chloro-2-fluorophenol to 4-chloro-6-fluoro-alpha-dimethylamino-o-cresol by the action thereon of dimethyl amine and formaldehyde; (4) converting the 4-chloro-6-fluoro-alpha-dimethylamino-o-cresol to 5-chloro-3-fluorosaligenin diacetate by the action of acetic acid; and (5) producing 3-fluorosalicylaldehyde from the 5-chloro-3- fluorosaligenin diacetate. Although the present method of producing 3-fluorosalicylaldehyde from a simple derivative of aniline is believed to be novel, the critical aspect of the process of the invention resides in the introduction of a chloro substituent into the benzene ring of o-anisidine to block one of the reactive positions and thereby prevent undesired side reactions in later processing. An intermediate product is subsequently dechlorinated to produce the desired structure.

The production of 3-fluorosalicylaldehyde even according to the advantageous method of the invention is a lengthy operation. Furthermore, practicing the method requires the production of several compounds not known to the art at the time of our invention, and the process of the invention is practical only because of the specific structure of the various intermediates produced, and because the various reactions involved are conducted in a specific order. The essential structural characteristic of the intermediates produced in the practice of the invention is the chloro group in the position meta to that occupied by the fluoro substituent. It is essential that this chloro substituent be present in the molecule, and that it be introduced prior to the introduction of the fluoro group. The presence of this chlorine is required when formaldehyde and dimethylamine are used to introduce the group —$CH_2N(CH_3)_2$ into the 4-chloro-2-fluorophenol molecule. If this reaction were conducted with 2-fluorophenol (instead of with 4-chloro-2-fluorophenol) two isomers would be formed, i. e.,

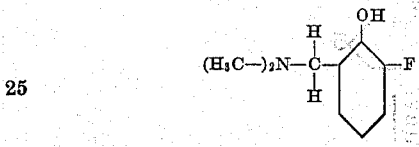

and

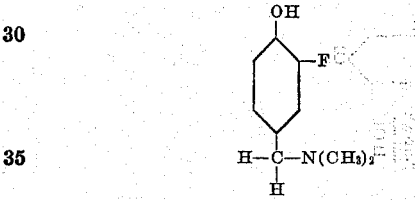

These two isomers would be extremely difficult to separate because of their closely similar characteristics. By the method of the invention, the chloro group blocks the position para to the hydroxyl group and thereby assures that only the desired substitution (ortho to the hydroxyl group) occurs.

The production of 3-fluorosalicylaldehyde according to the invention is illustrated by the following simplified chemical diagrams. Two ways of converting the intermediate 5-chloro-3-fluorosaligenin diacetate to 3-fluorosalicylaldehyde in the final stages of the process, are shown:

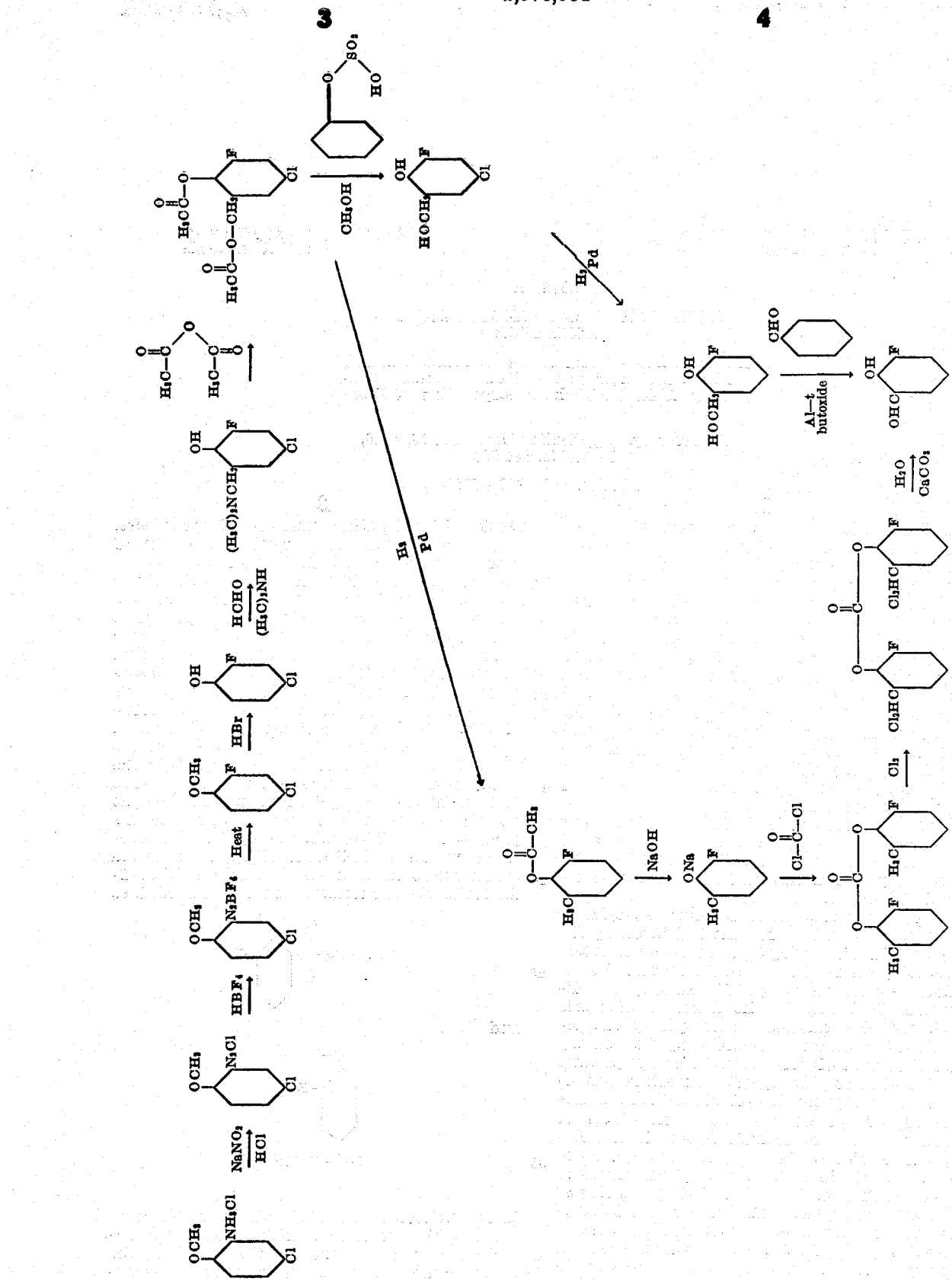

The preferred way of producing the 5-chloro-o-anisidine hydrochloride starting material of the process is by nitrating 1,4-dichlorobenzene and methylating the 2,5-dichloronitrobenzene produced, using methyl alcohol and sodium hydroxide for the methylation, and then reducing the $NO_2$ group of the 4-chloro-2-nitroanisole to produce 5-chloro-o-anisidine by the action of iron and water; the 4-chloro-2-nitroanisole is converted to the hydrochloride by the action of HCl in the presence of acetic acid.

In the final stages of the procedure illustrated by the foregoing simplified diagrams the intermediate 5-chloro-3-fluorosaligenin diacetate is converted to 3-fluorosalicylaldehyde by either of two general methods; each of the general methods involves a dechlorination and a de-esterification. The dechlorination and de-esterification are carried out to produce either 3-fluorosaligenin or 6-fluoro-o-cresol (i. e., are carried out to produce a compound having the general formula

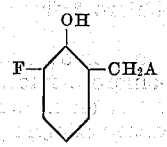

in which A is hydrogen or hydroxyl). The details of the method by which 3-fluorosalicylaldehyde is produced as a final step in the process of the invention are determined by whether the dechlorination and de-esterification are conducted to produce 3-fluorosaligenin or 6-fluoro-o-cresol. If the dechlorination and de-esterification are conducted to produce 6-fluoro-o-cresol, 3-fluorosalicylaldehyde is prepared therefrom by the following steps: (1) conversion of di-(6-fluoro-o-tolyl-) carbonate; (2) production therefrom, by chlorination, of di-(6-fluoro-alpha,alpha-dichloro-o-tolyl-) carbonate; (3) hydrolysis of the chlorinated compound to 3-fluorosalicylaldehyde. If 3-fluorosaligenin (rather than 6-fluoro-o-cresol) is produced by the dechlorination and de-esterification, 3-fluorosalicylaldehyde is produced therefrom by oxidation, as claimed in our copending application entitled "Preparation of 3-flurosalicylaldehyde," a division hereof, Serial No. 206,926, filed January 19, 1951. The first described method is preferred because of the comparatively high yield of 3-fluorosalicylaldehyde which results therefrom, and because the compounds produced in carrying out the method are relatively stable so that less care is required to prevent undesirable side reactions. The second described method is preferred because the desired product can be produced thereby at a substantially lower chemical cost.

*Example 1*

3-fluorosalicylaldehyde was produced from 5-chloro-o-anisidine hydrochloride according to the following procedure:

5-chloro-o-anisidine hydrochloride (193 grams) was mixed with hydrochloric acid (320 grams of a 37 weight per cent aqueous acid and 380 cc. of water), and the solution which resulted was cooled to a temperature between −5° C. and −10° C. by adding pulverized solid carbon dioxide thereto. While this temperature was thus maintained by continued additions, a saturated aqueous solution of sodium nitrite (150 cc.) was added over a period of 45 minutes with vigorous stirring. The rate of sodium nitrite addition was the maximum that could be used without liberation of $NO_2$. The mixture was then warmed to 20° C. to complete diazotization, and a mixture of boric acid (136 grams) and hydrofluoric acid (325 grams of a 60 weight per cent aqueous solution) was added thereto. The solution was then cooled to about −25° C., and the solids were separated by filtration. The collected precipitates was washed with ethylene dichloride (250 cc.) and vacuum dried about 16 hours at room temperature (total pressure 3 to 8 inches Hg). The dried precipitate was placed in a flask and thermally decomposed, under vacuum, by heating the entire surface of the flask to insure escape of the liquid decomposition products; heating was continued to dull redness. The decomposition products were collected in an absorption train, the absorbents being (1) a water-ice slurry, and (2) a sodium hydroxide solution; vacuum was applied to the flask containing the sodium hydroxide. The organic decomposition products were recovered by steam distillation from the combined ice- and sodium hydroxide-absorbents. The organic layer in the distillate was separated and dried over calcium chloride (about 10 grams), and pure 4-chloro-2-fluoroanisole (86 grams) was isolated by a final distillation. The overall conversion of 5-chloro-o-anisidine hydrochloride to 4-chloro-2-fluoroanisole was about 54 per cent.

A mixture of 4-chloro-2-fluoroanisole (255 grams) and dichlorofluorobenzene (345 grams) was combined with hydrobromic acid (1800 grams of a 50 weight per cent aqueous solution), and the resulting solution was refluxed with vigorous stirring, for 16 hours. A clear liquid product was separated from the mixture remaining (after the refluxing) by a steam distillation; this clear product was extracted with sodium hydroxide (1 liter of a 10 per cent by weight aqueous solution). The crude caustic solution of the desired product was separated from the dichloro-fluoro benzene introduced with the 4-chloro-2-fluoroanisole, and was heated to distill non-phenolic material therefrom; it was then acidified with sulfuric acid (120 grams of a 20 weight per cent aqueous solution) and the 4-chloro-2-fluorophenol (230 grams) was separated by steam distillation from the resulting acidic aqueous layer. This amounts to a 98.5 per cent yield of 4-chloro-2-fluorophenol, based upon the anisole consumed.

The 4-chloro-2-fluorophenol (1042 grams) and dimethylamine (2615 grams of a 25 weight per cent aqueous solution) were added to a flask, and the mixture was cooled to 30° C. Aqueous formaldehyde (a total of 625 grams of a 40 weight per cent solution) was added stepwise with stirring to this mixture. The formaldehyde was added at such a rate that the temperature of the mixture did not rise above 45° C. When the formaldehyde-addition was complete, the mixture was stirred thoroughly and was heated on a steam bath at about 80° C. for 18 hours. The liquid in the flask was then cooled and the oily product which had separated was solidified by the addition of a few crystals of 4-chloro-alpha-dimethylamino-6-fluoro-o-cresol. The solid product (4-chloro-alpha-dimethylamino-6-fluoro-o-cresol) which formed was separated by filtration. The filtrate was then cooled, concentrated, and steam distilled to recover further 4-chloro-alpha-dimethylamino-6-fluoro-o-cresol, the total recovery of which amounted to 1376 grams, which corresponds to a 95 per cent yield based upon the 4-chloro-2-fluorophenol charged.

Acetic anhydride (800 cc.) and 4-chloro-alpha-dimethylamino-6-fluoro-o-cresol (345 grams) were refluxed for 16 hours. Fractional distillation of the resulting product through an 18 inch column resulted in the isolation of 360 grams of 5-chloro-3-fluorosaligenin diacetate, which corresponds to a yield of 82 per cent based upon the 4-chloro-alpha-dimethylamino-6-fluoro-o-cresol used.

Sodium acetate (25 grams), 5-chloro-3-fluorosaligenin diacetate (52 grams), and a methanol solution of palladium on a charcoal carrier (2 grams of a catalyst comprising 5 weight per cent of palladium dissolved in 150 cc. of methanol) were placed in a closed flask and subjected to a hydrogen atmosphere at a total pressure of about 40 pounds per square inch gauge. The flask was then placed on a commercial shaker and shaken for about 90 minutes (until a pressure drop of about 30 pounds per square inch indicated the reaction of about 0.4 mol of hydrogen). The catalyst was separated from the liquid by filtration and the filtrate was concentrated by distilling volatile matter until the liquid temperature was about 100° C. The residue after distillation of the volatile material (comprising 6-fluoro-o-cresol acetate) was dissolved in aqueous sodium hydroxide (200 cc. of a 10 weight per cent solution), and the resulting mixture was refluxed until solution was complete (about 90 minutes). This solution was acidified with sulfuric acid (about 250 grams of a 20 weight per cent solution), and 6-fluoro-o-cresol produced by the hydrolysis of the 6-fluoro-o-cresol acetate was recovered by a steam distillation from the acidified solution. The recovery of 17 grams of this product indicated a 68 per cent yield based upon the 5-chloro-3-fluorosaligenin diacetate charged.

Aqueous sodium hydroxide (42 grams of a 50 weight per cent solution), 6-fluoro-o-cresol, (62.5 grams) and water (100 cc.) were mixed and cooled to 0° C., at which temperature they were treated with phosgene, which was added slowly, with vigorous stirring, until the solution was slightly acid. This phosgene addition took six hours. At the end of the phosgene treatment there were two layers, a lower organic layer and an upper aqueous layer; the lower layer was separated and the desired di-(6-fluoro-o-tolyl-) carbonate was separated by fractional distillation.

Chlorine was passed slowly through di-(6-fluoro-o-tolyl-) carbonate (25 grams) heated to a temperature between 125° C. and 140° C. for a period of sixteen hours until between 8 and 10 grams of chlorine had been accepted by the carbonate.

The di - (6 - fluoro - alpha,alpha - dichloro - o-tolyl-) carbonate produced as described in the preceding paragraph, aqueous ethyl alcohol (80 cc. of a solution comprising 50 weight per cent of ethyl alcohol), and calcium carbonate (27 grams) were placed in a stainless steel bomb and were heated to a temperature between about 135° C. and about 145° C. for one hour. The bomb was cooled, opened, and washed with hydrochloric acid (150 cc. of a 10 weight per cent aqueous solution). Fractional distillation of the washings to drive off the alcohol, and steam distillation of the residue freed the desired 3-fluorosalicylaldehyde.

*Example 2*

An alternative method for producing 3-fluorosalicylaldehyde was also carried out. 5-chloro-3-fluoro-saligenin diacetate was produced from 2,5-dichloronitrobenzene according to the procedure described in Example 1. In carrying out the alternative method the 5 - chloro - 3 - fluoro-saligenin diacetate was converted to 5-chloro-3-fluorosaligenin according to the following procedure:

5 - chloro - 3 - fluorosaligenin diacetate (260 grams), methanol (1200 cc.) and benzene sulfonic acid (1 gram) were mixed and heated to reflux. A slow distillation through a four foot column (using a reflux ratio of 30:1) was then started. This distillation was discontinued when the total distillate (principally the methyl alcohol-methyl acetate azeotrope: boiling point 53° C.) amounted to 900 cc. The residue in the still was then diluted with water to make a total volume of three liters. A few crystals of 5-chloro-3-fluorosaligenin were added thereto, and the desired product, which crystallized immediately, was separated from the liquid by filtration and was air dried. Further product was crystallized by making the filtrate slightly alkaline, concentrating it to a volume of 500 cc., acidifying, and adding a few crystals of 5-chloro-3-fluorosaligenin. The total recovery of 5-chloro-3-fluorosaligenin amounted to 175 grams, which corresponds to a 99 per cent yield based upon the 5-chloro-3-fluorosaligenin diacetate used.

Aqueous sodium hydroxide (400 cc. of one normal caustic), 5-chloro-3-fluorosaligenin (35.3 grams) and palladium on a charcoal carrier (3 grams of a composition comprising 5 weight per cent of palladium) were placed in a flask and subjected to a hydrogen atmosphere at a total pressure of 30 pounds per square inch gauge. The flask was then placed on a commercial shaker and shaken for about 30 minutes (until a pressure drop of about 15.5 pounds per square inch indicated the reaction of about 0.2 mol of hydrogen). The catalyst was separated from the liquid by filtration, and the filtrate was acidified by hydrochloric acid (50 cc. of a 30 weight per cent solution). The acidified liquid was saturated with sodium chloride; crystals of 3-fluorosaligenin precipitated and were separated by filtration. These crystals were dissolved in acetone (200 cc.), and salt was separated from the acetone solution by filtration. The filtrate was placed in an evaporating dish and the acetone was allowed to evaporate leaving the dry 3-fluorosaligenin (18 grams). This corresponds to a 64 per cent yield of the desired product.

Aluminum isopropoxide (10 grams), 3-fluorosaligenin (2.84 grams) and tertiary-butyl alcohol (500 cc.) were refluxed for about 16 hours, and volatile material was then distilled to concentrate the solution to 100 cc. Tertiary-butyl alcohol (300 cc.) and o-chlorobenzaldehyde (300 cc.) were added to the concentrate and the resulting mixture was refluxed gently for 16 hours, cooled, and filtered. Sulfuric acid (200 cc. of a 10 weight per cent aqueous solution) was added to the cooled mixture, which was then made alkaline by gradual additions of sodium hydroxide (a 50 weight per cent solution). The alkaline aqueous phase was separated from the organic phase in a separatory funnel, and the organic layer was then extracted twice more with 10 weight per cent aqueous sodium hydroxide (200 cc. portions). The three alkaline extracts were combined, and the resulting solution was steam distilled until no further organic material was detected in the distillate. The residue after this distillation was made acid with acetic acid and p-toluidine (3 grams) in acetic acid (25 cc. of a 20 weight per cent aqueous acid) was added to the acidified solution. The Schiff's base so precipitated, when separated and dried, amounted to 2.15 grams. This indicated a 47 per cent conversion of the 3-fluorosaligenin to the corresponding aldehyde.

We claim:

A method of producing 3-fluorosalicylaldehyde that comprises (1) diazotizing 5-chloro-o-anisidine and converting the resulting diazotized material to 4 - chloro- 2 - fluoro - anisole by (A) forming the diazonium fluoborate by the action of fluoboric acid and (B) thermally decomposing the diazonium fluoborate; (2) hydrolyzing the 4 - chloro - 2 - fluoro - anisole to produce 4-chloro-2-fluorophenol; (3) converting the 4-chloro-2-fluorophenol to 4-chloro-6-fluoro-alpha-dimethylamino-o-cresol by the action thereon of formaldehyde and dimethylamine; (4) converting the 4-chloro-6-fluoro-alpha-dimethylamino-o-cresol to 5-chloro-3-fluorosaligenin diacetate by the action of acetic acid; (5) dechlorinating the 5-chloro-3-fluoro-saligenin diacetate to 3-fluoro-o-cresol acetate by the action of hydrogen in the presence of a palladium catalyst; (6) converting the 3-fluoro-o-cresol acetate to di-(6-fluoro-o-tolyl-) carbonate; (7) chlorinating the di-(6-fluoro-o-tolyl-) carbonate to produce di-(6-fluoro-alpha,alpha-dichloro-o-tolyl-) carbonate; and (8) hydrolyzing the di-(6-fluoro-alpha,alpha-dichloro-o-tolyl-) carbonate.

EDGAR C. BRITTON.
JAMES D. HEAD.

No references cited.